(12) United States Patent
Viscome et al.

(10) Patent No.: US 12,365,057 B2
(45) Date of Patent: Jul. 22, 2025

(54) METHOD FOR REPLACING AT LEAST ONE TOOTH OF A GEAR

(71) Applicant: Inventus Holdings, LLC, Juno Beach, FL (US)

(72) Inventors: Drake J. Viscome, Jupiter, FL (US); Julia D. Batts, Jupiter, FL (US); Martin E. Lohan, Palm City, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 158 days.

(21) Appl. No.: 18/092,094

(22) Filed: Dec. 30, 2022

(65) Prior Publication Data

US 2024/0217039 A1 Jul. 4, 2024

(51) Int. Cl.
*B23P 6/00* (2006.01)
*B23P 15/14* (2006.01)

(52) U.S. Cl.
CPC .............. *B23P 15/14* (2013.01); *B23P 6/00* (2013.01); *B23P 6/005* (2013.01)

(58) Field of Classification Search
CPC .................................. B32P 6/00; B23P 15/14
See application file for complete search history.

(56) References Cited

U.S. PATENT DOCUMENTS

| | | | |
|---|---|---|---|
| 3,439,551 A * | 4/1969 | Militana | F16H 55/12 74/447 |
| 3,755,877 A * | 9/1973 | Thompson | B23P 15/28 29/402.13 |
| 5,384,950 A | 1/1995 | Kallenberger | |
| 8,287,238 B2 | 10/2012 | DiMascio | |
| 10,378,636 B2 | 8/2019 | Brown | |
| 10,625,381 B2 * | 4/2020 | Boudot | B23Q 9/02 |
| 2020/0331103 A1 | 10/2020 | Toft | |

FOREIGN PATENT DOCUMENTS

| | | |
|---|---|---|
| EP | 2108815 B1 | 2/2009 |
| ES | 2437199 A2 | 7/2012 |
| WO | 2004/001223 A1 | 12/2003 |

* cited by examiner

*Primary Examiner* — Sarang Afzali
(74) *Attorney, Agent, or Firm* — Tarolli, Sundheim, Covell & Tummino LLP

(57) ABSTRACT

A method of replacing at least one tooth of a gear includes providing a tool jig including a mounting block with a plurality of indexing jig features. The tool jig also includes a tool-supporting feature in laterally movable contact with a jig rail feature. With at least one indexing jig feature, relative motion of the tool jig relative to the gear is resisted. A material-removal tool is operated, while attached to the tool-supporting feature in the tooth-removal position, to remove at least a portion of a working circumference of the gear including a native gear tooth to be replaced. Motion of the material-removal tool is guided to generate a circumferential gear cut including a relatively smooth first cut surface formed by removal of at least the native gear tooth to be replaced. The material-removal tool is removed from the tool-supporting feature. The tool jig is removed from the gear.

13 Claims, 11 Drawing Sheets

METHOD FOR REPLACING AT LEAST ONE TOOTH OF A GEAR

TECHNICAL FIELD

This disclosure relates to an system and method for replacing at least one tooth of a gear and, more particularly, to a method and system of removing at least one damaged native gear tooth and replacing it with an apparatus including at least one replacement tooth.

BACKGROUND

The blades on a wind turbine pitch system are moved with a motor/drive and gear teeth on an inner race of a blade bearing. The gear interface between the drive and the inner race has been observed to develop wear damage on the gear teeth on the inner race. This wear can progress to the point where aerodynamic imbalance is developed, stressing the mechanical connections in the pitch system. If left unchecked, the wear will progress until the axis no longer pitches.

Correction of this undesirable condition is commonly accomplished by either "indexing" the axis to locate the worn teeth into a range that is not used, or replacing the bearing. Both of these solutions can be time-consuming and expensive.

SUMMARY

In an aspect, alone or in combination with any other aspect, a method of replacing at least one tooth of a gear is described. The gear includes a plurality of fastening apertures extending longitudinally thereinto from a top gear surface. The top gear surface is substantially perpendicular to an extension direction of the gear teeth. A tool jig is provided, the tool jig including a mounting block with a plurality of indexing jig features being spaced laterally apart by a distance corresponding to a distance between correspondingly adjacent fastening apertures in the top gear surface. The tool jig also includes a tool-supporting feature in laterally movable contact with a jig rail feature. The tool jig is placed into a predetermined relationship with the top gear surface, guided by at least a selected indexing jig feature. With at least one indexing jig feature, relative motion of the tool jig relative to the gear is resisted. A material-removal tool is removably attached to the tool-supporting feature with the tool-supporting feature in a tooth-removal position. The material-removal tool is operated, while attached to the tool-supporting feature in the tooth-removal position, to remove at least a portion of a working circumference of the gear including a native gear tooth to be replaced. Motion of the material-removal tool, while removing at least the portion of the working circumference of the gear, is guided via interaction of the tool-supporting feature with the jig rail feature in the tooth-removal position, to generate a circumferential gear cut including a relatively smooth first cut surface formed by removal of at least the native gear tooth to be replaced. The material-removal tool is removed from the tool-supporting feature. The at least one indexing jig feature is manipulated to release the tool jig from the gear. The tool jig is removed from the gear.

In an aspect, alone or in combination with any other aspect, a system for replacing at least one tooth of a gear is described. The gear includes a plurality of fastening apertures extending longitudinally thereinto from a top gear surface. The top gear surface is substantially perpendicular to an extension direction of the gear teeth. A tool jig includes a mounting block with a plurality of indexing jig features being spaced laterally apart by a distance corresponding to a distance between correspondingly adjacent fastening apertures in the top gear surface. The tool jig also includes a tool-supporting feature in laterally movable contact with a jig rail feature. A material-removal tool is configured for attachment to the tool-supporting feature with the tool-supporting feature in a tooth-removal position. The mounting block is placed into a predetermined relationship with the top gear surface at least partially guided by the indexing jig features. The tool-supporting feature is configured to guide motion of the material-removal tool for removing at least the portion of the working circumference of the gear. Such motion is guided via interaction of the tool-supporting feature with the jig rail feature in the tooth-removal position, to generate a circumferential gear cut including a relatively smooth first cut surface formed by removal of at least a native gear tooth to be replaced.

BRIEF DESCRIPTION OF THE DRAWINGS

For a better understanding, reference may be made to the accompanying drawings, in which.

DESCRIPTION OF ASPECTS OF THE DISCLOSURE

The invention comprises, consists of, or consists essentially of the following features, in any combination.

Figure 1:
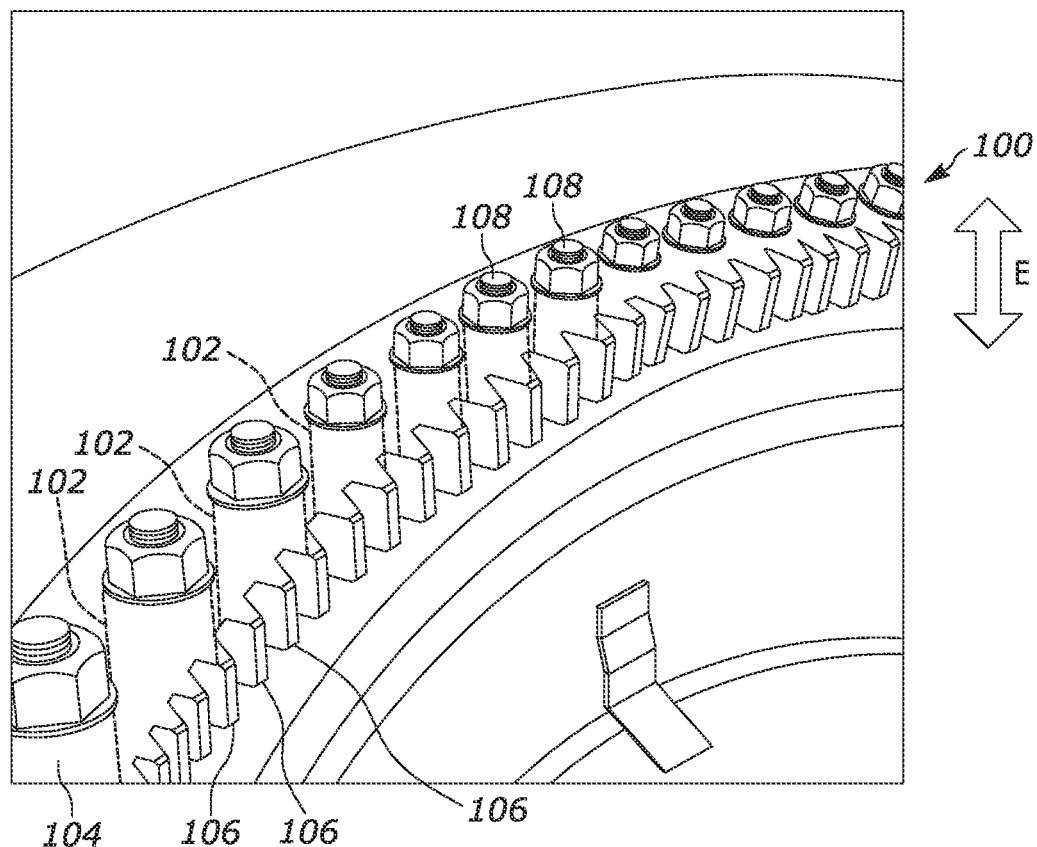
FIG. 1 is a top perspective view of an example use environment for an aspect of the invention.

FIG. 1 depicts a gear 100 including a plurality of fastening apertures 102 (shown in hidden line in FIG. 1) extending longitudinally thereinto from a top gear surface 104. The top gear surface 104 is substantially perpendicular to an extension direction (denoted by arrow "E", A.K.A. a "longitudinal" direction) of the gear teeth 106. As shown in FIG. 1, the gear 100 includes a plurality of fasteners 108 maintained within corresponding fastening apertures 102. The gear 100 of FIG. 1 may be, for example, an inner race of a blade bearing of a wind turbine pitch system. However, one of ordinary skill in the art will be able to readily configure the described functions, actions, components, and structures shown and described herein for any desired gear tooth 106 replacement operation, in any industry.

FIGS. 2-4, 6-7, and 9-12 schematically depict an example sequence of operation of a method for replacing at least one native tooth 106 of the gear 100. For example, when at least one native gear tooth 106 becomes sufficiently damaged, it may be desirable to remove and replace just the damaged gear tooth/teeth (shown as 106D in the Figures), potentially along with one or more adjacent, "healthy" gear teeth (those healthy teeth to be removed are also characterized here as 106D), as is known in the industry. The damaged teeth 106D will be shown and described herein as being replaced with a denture apparatus 110 component, which may be similar to that shown and described in co-pending U.S. patent application Ser. No. 18/091,955, filed concurrently herewith and titled "Apparatus for Replacing At Least One Tooth of a Gear" (hereafter referenced as "the '955 application"), the entire contents of which are incorporated herein by reference for all purposes.

Figure 2:
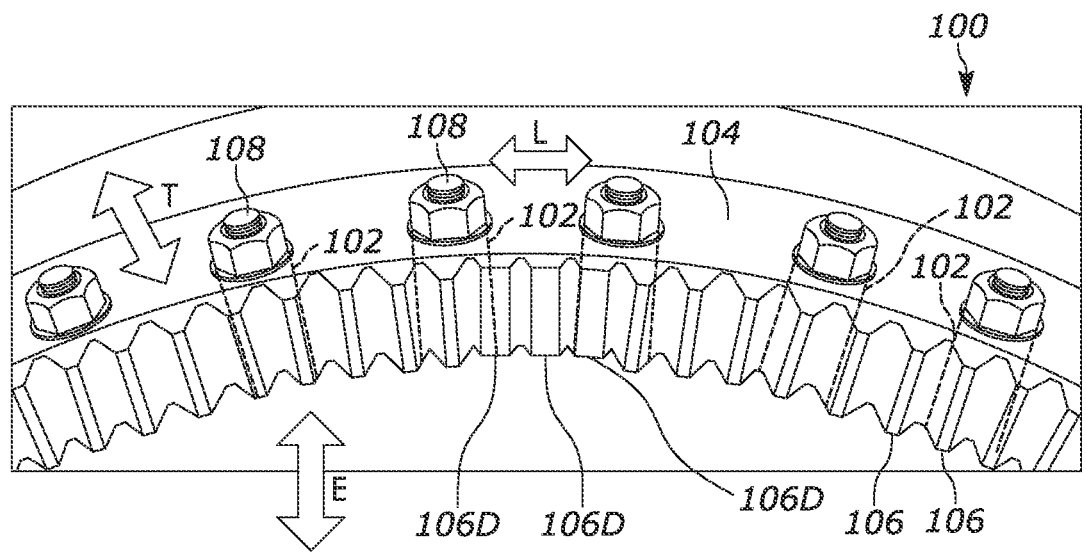
FIGS. 2-4, 6-7, and 9-12 schematically depict an example sequence of operation of a method according to an aspect of the invention.
Figure 3:
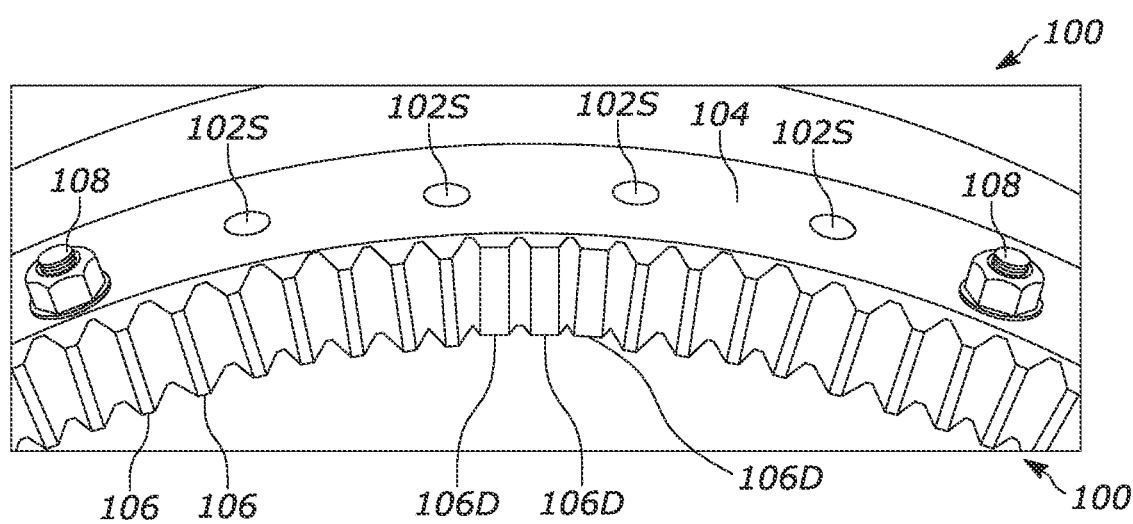

The sequence of replacing at least one damaged tooth 106D begins by identifying the teeth 106D to be removed, as shown in FIG. 2. Next, at least one fastener 108 of the plurality of fasteners 108 is removed from a corresponding fastening aperture 102 to create a selected fastening aperture 102S. At least one selected fastening aperture 102S may be located at least one of transversely adjacent to and laterally adjacent to the native gear tooth 106D being replaced. As used herein, the "transverse" direction is substantially perpendicular to the extension direction, and is substantially parallel to a direction in which the gear teeth 106 extend or protrude from a "base" portion (which includes the fastening apertures 102) of the gear 100. The transverse direction is indicated by arrow T in FIG. 2. As used herein, the "lateral" direction is substantially perpendicular to both the extension and transverse directions, extends substantially horizontally, in the orientation of FIG. 2, and is indicated by arrow L in that Figure. FIG. 3 shows the gear 100 with a plurality of fasteners 108 removed to expose a plurality of selected fastening apertures 102S.

Figure 4:
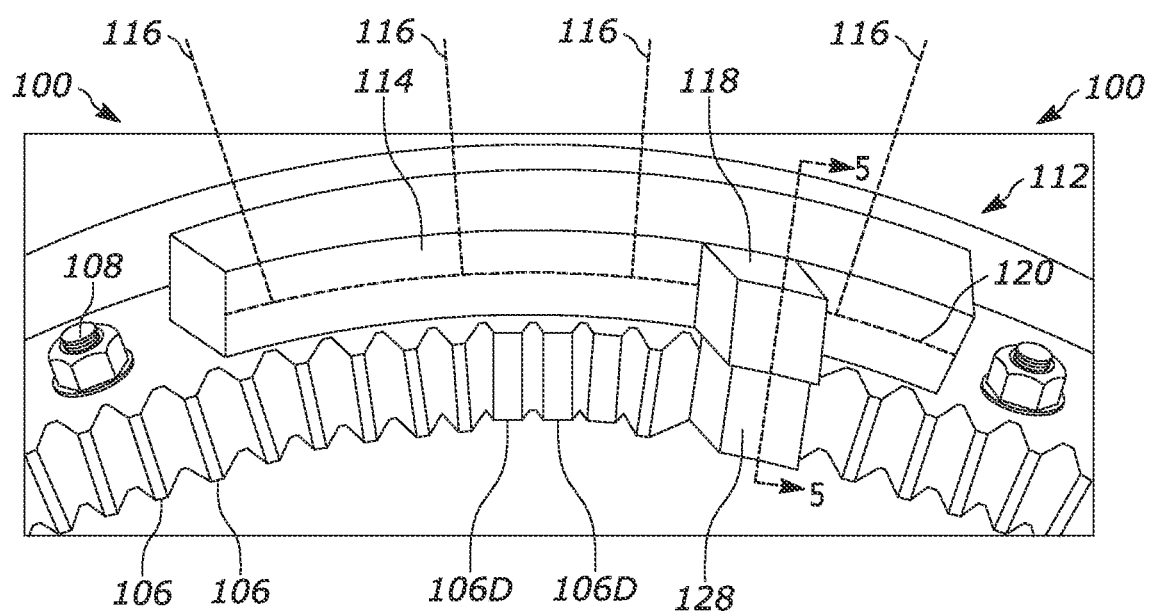
Figure 5:
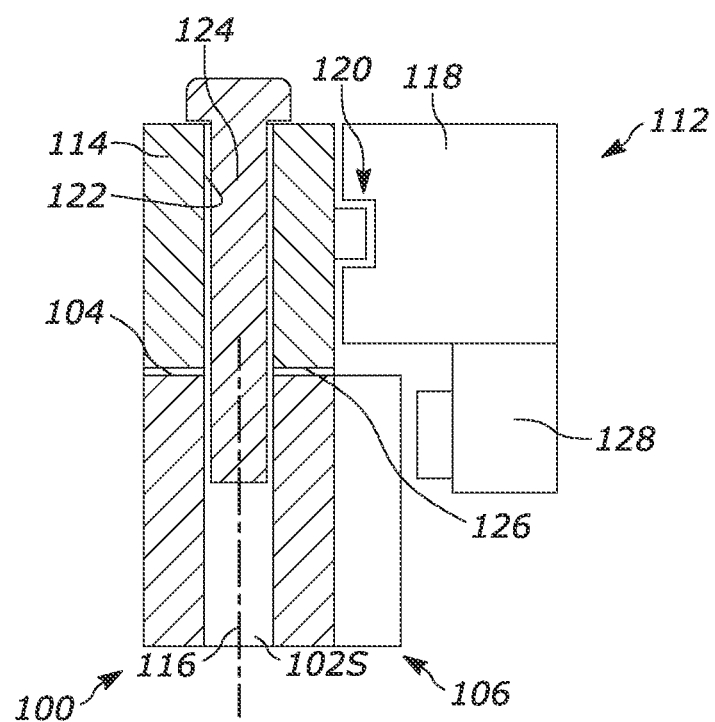
FIG. 5 is a cross-sectional view taken along line 5-5 of FIG. 4.
Figure 6:
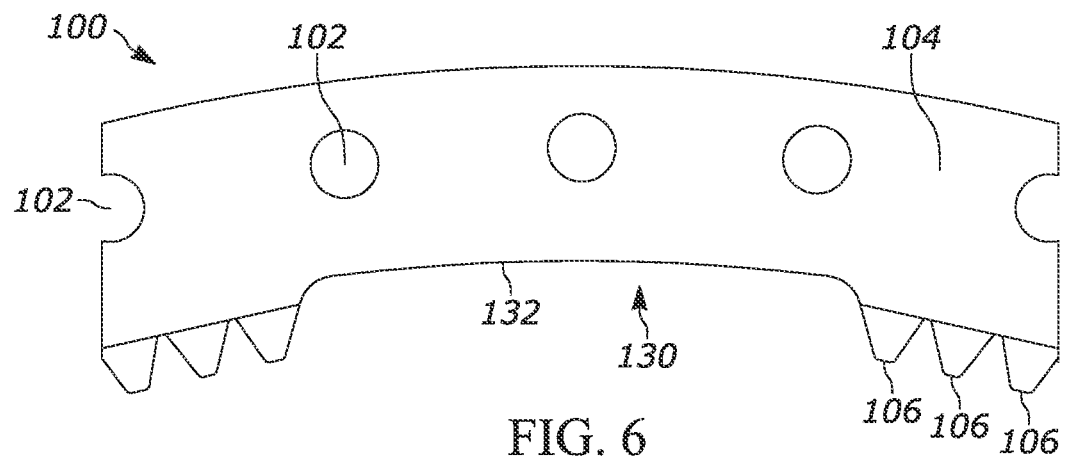

With reference now to FIG. 4, a tool jig 112 is provided. The tool jig 112 includes a mounting block 114 having a plurality of indexing jig features (depicted schematically at 116) spaced laterally apart from one another by a distance corresponding to a distance between correspondingly adjacent fastening apertures 102 in the top gear surface 104. In other words, the indexing jig features 116, regardless of their specific configuration, may be located upon the mounting block 114 in positions which correspond to (e.g., align with) selected fastening apertures 102S of the underlying gear 100, when the mounting block 114 is in a predetermined position with relation to the gear 100. The tool jig 112 also includes a tool-supporting feature 118 in laterally movable contact with a jig rail feature, shown schematically as 120 in FIGS. 4-5.

The jig rail feature 120 may be of any desired type which is operative to support and/or guide lateral motion of the tool-supporting feature 118 with respect to the mounting block 114. This lateral motion may be slidable motion, or could include a wheeled or geared component, or occur in any other desired manner. As such, the jig rail feature 120, or components thereof, could be located on either or both of the tool-supporting feature 118 and the mounting block 114. For example, the jig rail feature 120 can include a dovetail joint, a wheeled track, a shelf-type protrusion, a captured-ball mechanism, a rack and pinion, a worm drive, a slide rail, and/or any other desired mechanism for assisting with the described lateral motion. One of ordinary skill in the art can readily provide a suitable jig rail feature 120 for a particular use environment, although a sliding rail type arrangement is used as an example in the Figures and description herein.

Likewise, each indexing jig feature 116 may be of any desired configuration, with one or more types of indexing jig features 116 potentially provided concurrently for a particular use environment. As shown in the cross-sectional view of FIG. 5, at least one indexing jig feature 116 may include a block hole 122 extending longitudinally through the mounting block 114. To utilize a block hole 122 type of indexing jig feature 116, the tool jig 112 may be placed on the top gear surface 104 with at least a selected block hole 122 being longitudinally aligned with (i.e., lined up on top of) a selected fastening aperture 102S. An elongate pin 124 (which may have any suitable configuration, such as including a head or other securing feature) is then inserted at least partially into both the selected block hole 122 and the selected fastening aperture 102S, to resist relative motion of the tool jig 112 relative to the gear 100.

As another example, at least one indexing jig feature 116 may be a jig protrusion extending longitudinally from a lower jig surface 126 of the tool jig 112. (That is, the jig protrusion could effectively act as an elongate pin 124 incorporated bodily into the tool jig 112, rather than the elongate pin 124 being a separate piece inserted through a block hole 122.) When a jig protrusion is present, the tool jig 112 may similarly be placed on the top gear surface 104 with at least a selected jig protrusion being longitudinally aligned with a selected fastening aperture 102S. The selected jig protrusion may then be inserted at least partially into the selected fastening aperture 102S, to resist relative motion of the tool jig 112 relative to the gear 102.

Regardless of the precise nature of the components effectuating such interaction, the tool jig 112 shown in the Figures may be placed on the top gear surface 104 with at least a selected indexing jig feature 116 longitudinally aligned with a selected fastening aperture 102S, in such a way that, with the at least one indexing jig feature 116, relative motion of the tool jig 112 relative to the gear 100 is resisted. Accordingly, the tool jig 112 is secured, under the influence of at least one of gravity and an indexing jig feature 116, to provide a stable, repeatable, and indexed positioning of the tool jig 112 with respect to the gear teeth 106D which are being removed and replaced.

It is contemplated that the tool jig 112 could be placed into a desired spatial relationship with respect to the gear teeth 106D in any desirable manner. For example, whether or not the selected fastening apertures 102S are made available to help with indexing, the tool jig 112 may be maintained in a desired position with respect to the damaged gear teeth 106D using one or more of magnets, clamps, adhesives, rods, welds, clips, screws, bolts, pegs, other temporary or at least semi-permanent fasteners, or any combination(s) thereof. However, by way of example, the fastening aperture(s) 102S and indexing jig features 116 are shown in the Figures and described herein.

Again with reference to FIGS. 4-5, a material-removal tool 128 is removably attached to the tool-supporting feature 118 with the tool-supporting feature 118 being located and configured in a tooth-removal position. The material-removal tool 128 (shown schematically in the Figures) may be of any desired type, such as, but not limited to, a router, a mill, a plane, an annular bit, a hole saw, a grinder, and/or any other desired tool configured for the described material removal tasks. The material-removal tool 128 may be operated, while attached to the tool-supporting feature 118 in the tooth-removal position shown in FIGS. 4-5, to remove at least a portion of a working circumference of the gear 100 including at least one native gear tooth 106D to be replaced. The term "working circumference" is used here into indicate a surface of the gear 100 including a plurality of gear teeth 106, and which interacts in a tooth fashion with at least one other component of the machine comprising the gear 100. As shown in the Figures, the "working circumference" may be the curved inner race portion shown partially in FIG. 1 and containing the plurality of gear teeth 106.

In order to remove the desired portion of the working circumference of the gear 100 including at least one native gear tooth 106D to be replaced, motion of the material-removal tool 128 is guided via interaction of the tool-supporting feature 118 with the jig rail feature 120 while the tool-supporting feature 118 is in the tooth-removal position. For example, and as shown schematically in the Figures, removal of at least the native gear teeth 106D to be replaced is accomplished by the material-removal tool 128 via the generation (as guided by the jig rail feature 120) of a circumferential gear cut 130 including a relatively smooth first cut surface 132. This circumferential gear cut 130 is shown schematically in FIG. 6. The term "relatively smooth" is used herein to indicate that at least the native gear teeth 106D to be replaced are removed, leaving a surface that does not include gear tooth stubs or other remaining material at the location(s) of the removed teeth. A "relatively smooth" surface could have a profile which is substantially planar, curved, curvilinear, or any desired combination thereof.

Figure 7:
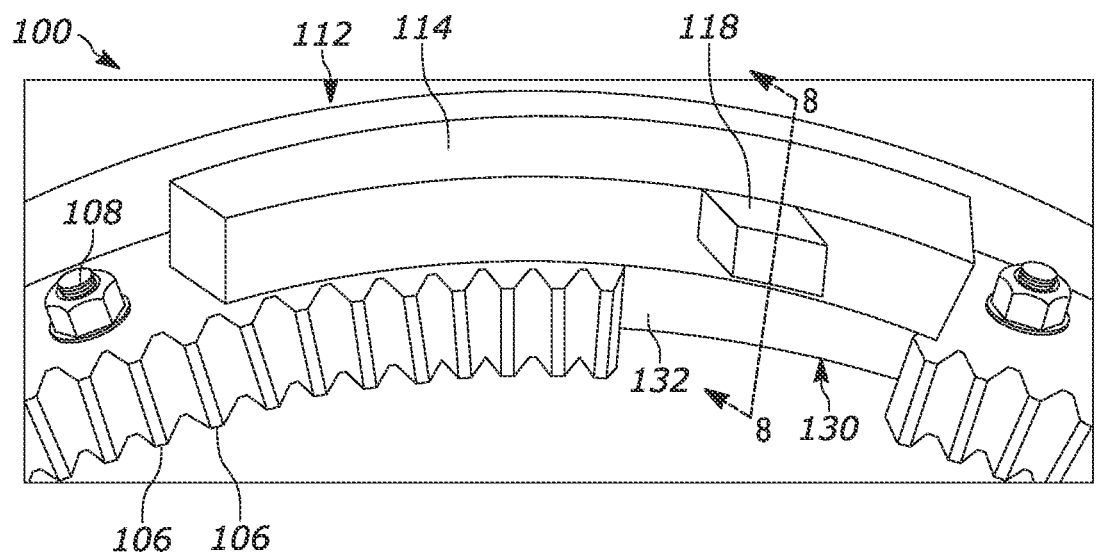

The circumferential gear cut 130 may be configured as desired for a particular use environment. For example, and as shown in the Figures, the first cut surface 132 may be substantially perpendicular to the top gear surface 104 of the gear 100. as previously mentioned, the circumferential gear cut 130 may include removal of at least a portion of the working circumference of the gear 100 including at least one native gear tooth 106D to be replaced (due to damage), as well as at least one gear tooth (also characterized as 106D, as previously mentioned) which may not itself be damaged, but is located adjacent to the "primary target" native gear tooth 106D to be replaced. It is contemplated that, during generation of the circumferential gear cut 130, a full-thickness portion of the working circumference of the cure 100 may be removed, as shown in FIG. 7. Alternatively, though not shown, the circumferential gear cut 130 could encompass less than a full longitudinal (extension direction) thickness of the working circumference, in cases when it is desirable for at least a portion of the native gear teeth 106D being removed to remain permanently or temporarily intact, for orientation or for any other reason. One of ordinary skill in the art can readily configure a circumferential gear cut 130 suited for a particular use environment.

Once the circumferential gear cut 130 is completed, the material-removal tool 128 may be removed from the tool-supporting feature 118, at least one indexing jig fixture 116 may be manipulated to release the tool jig 112 from the gear 100, and the tool jig 112 may be removed from the gear 100. In some use environments, simple creation of the circumferential gear cut 130 is sufficient to accommodate the damaged (and now removed) native gear teeth 106D. For example, the working circumference of the gear 100 could be rotated such that the circumferential gear cut 130 area is no longer in a position for meshing engagement with another component of the machine. As another example, a suitably configured denture apparatus (not shown) may be provided to the gear 100 at the circumferential gear cut 130, in a manner which is sufficient for continued operation of the gear 100.

However, the method of replacing at least one native gear tooth 106D also may include a second phase, shown schematically in FIGS. 7-10 and which will be described below, with reference to those Figures.

Figure 8:
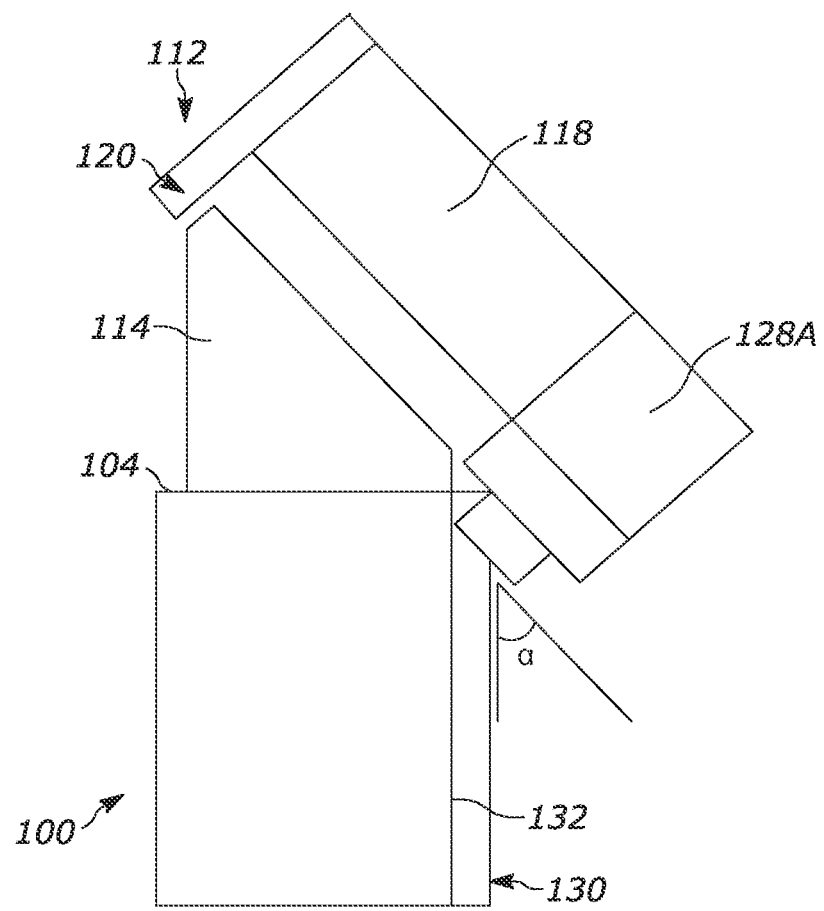
FIG. 8 is a cross-sectional view taken along line 8-8 of FIG. 7.
Figure 9:
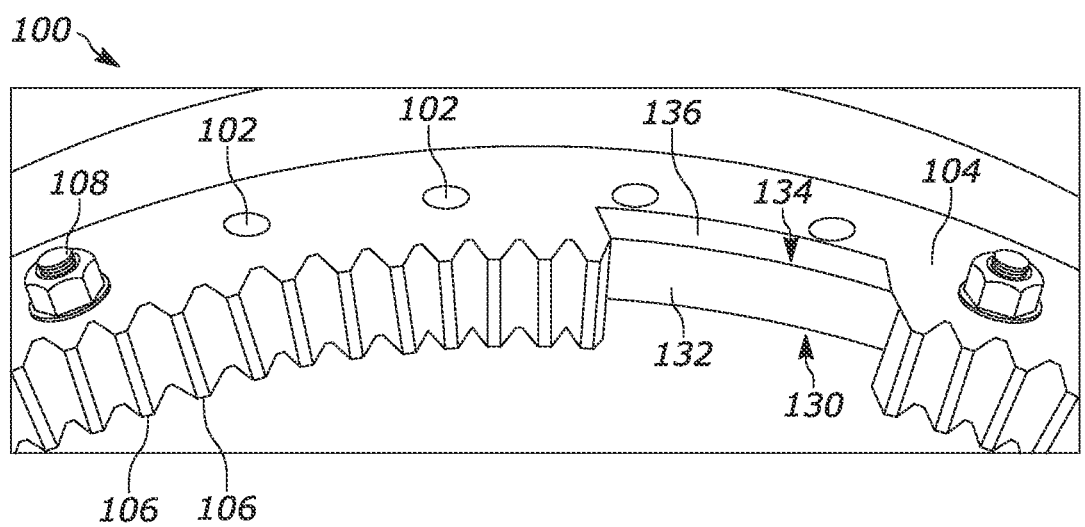
Figure 10:
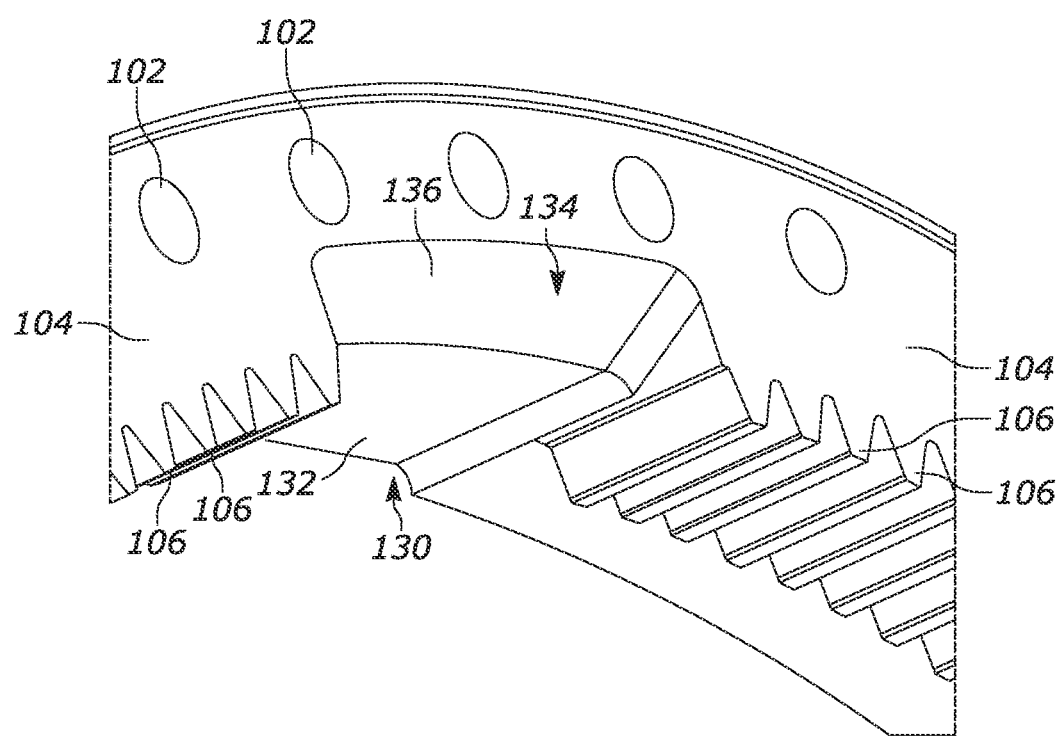

More specifically, after generation of the circumferential gear cut 130, the tool-supporting feature 118 may be adjusted to an angled support position with respect to the circumferential gear cut 130. This may be done in any desired manner. For example, and as shown in FIG. 8, the jig rail feature 120 may be adjusted to guide the tool-supporting feature 118 in a selected one of the tooth-removal position and the angled support position. This adjustment of the jig rail feature 120 could be accomplished by modifying and/or replacing part or all of the tool jig 112 in such a way as to hold the material-removal tool 128 at a predetermined angle α with respect to the first cut surface 132. As with generation of the circumferential gear cut 130, it is contemplated that the jig rail feature 120 will be coordinated in curvature with the working circumference of the gear 100 in order to make a smooth cut, at the predetermined angle α, with respect to the first cut surface 132.

In addition to, or instead of, adjustment of the jig rail feature 120, the tool-supporting feature 118 could be modified from the tooth-removal position to the angled support position at least partially by substitution of the (first) material-removal tool 128 and/or the (first) tool-supporting feature 118 with a (second) angled version. For example, the (first) material-removal tool 128 could be substituted on the tool-supporting feature 118 with an angled material-removal tool 128A, as shown schematically in FIG. 8.

Regardless of whether the (first) material-removal tool 128 or the angled material-removal tool 120 A is present, however, such tool may be operated, while attached to the tool-supporting feature 118 in the angled support position, to remove at least a portion of the first cut surface 132 at the predetermined angle α. This second, angled material-removal process will be guided via interaction of the tool-supporting feature 118 in the angled support position with the jig rail feature 122 generate a beveled gear cut 134 including a relatively smooth second cut surface 136 formed by removal of at least a portion of the first cut surface 132. This two-surfaced cut is shown schematically in FIGS. 9-11 and 13. One of ordinary skill in the art will be able to configure a tool jig 112 and other components for use with the method described herein, to produce any desired number of cut surfaces, having any desired relative or absolute angles, dimensions, orientations, or other physical properties for a particular use environment, following the spirit and scope of the present disclosure.

Once the beveled gear cut 134 has been created, the material-removal tool 128 may be removed from the tool-supporting feature 118, at least one indexing jig fixture 116 may be manipulated to release the tool jig 112 from the gear 100, and the tool jig 112 may be removed from the gear 100.

Figure 11:
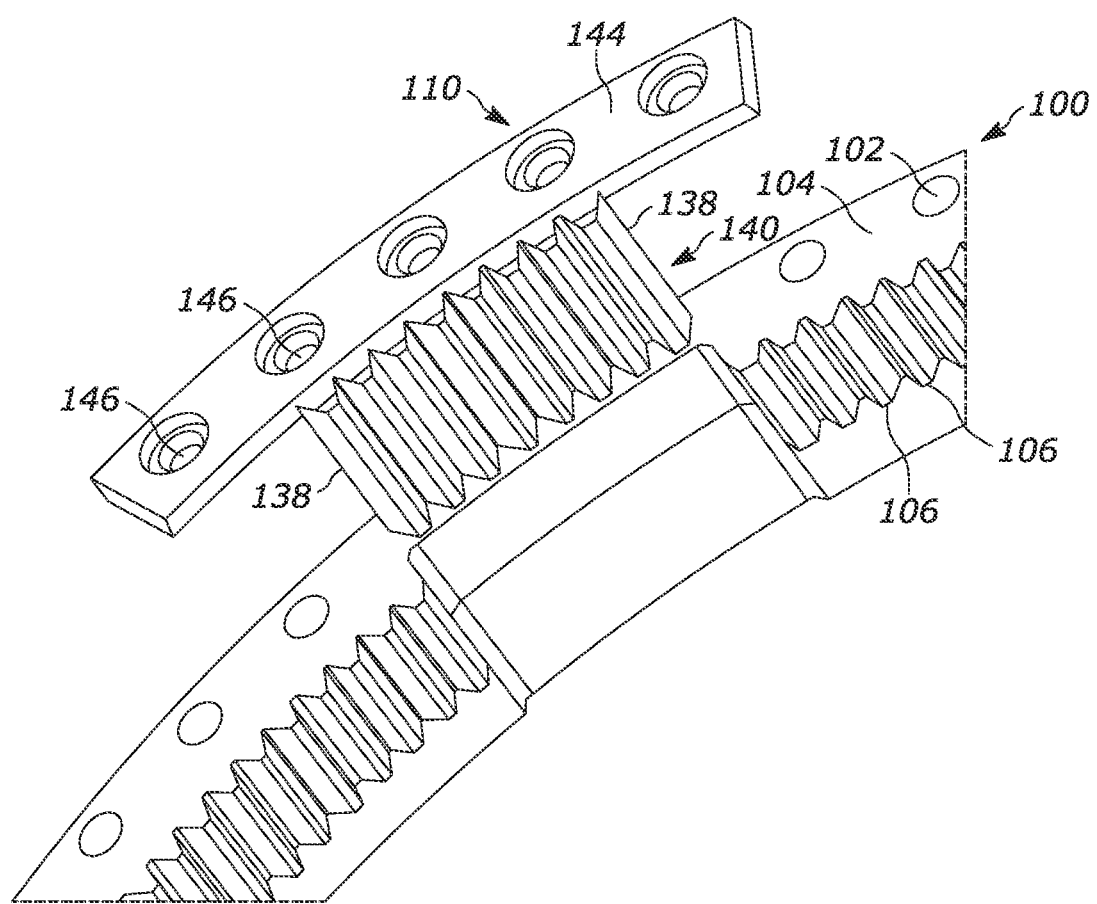
Figure 12:
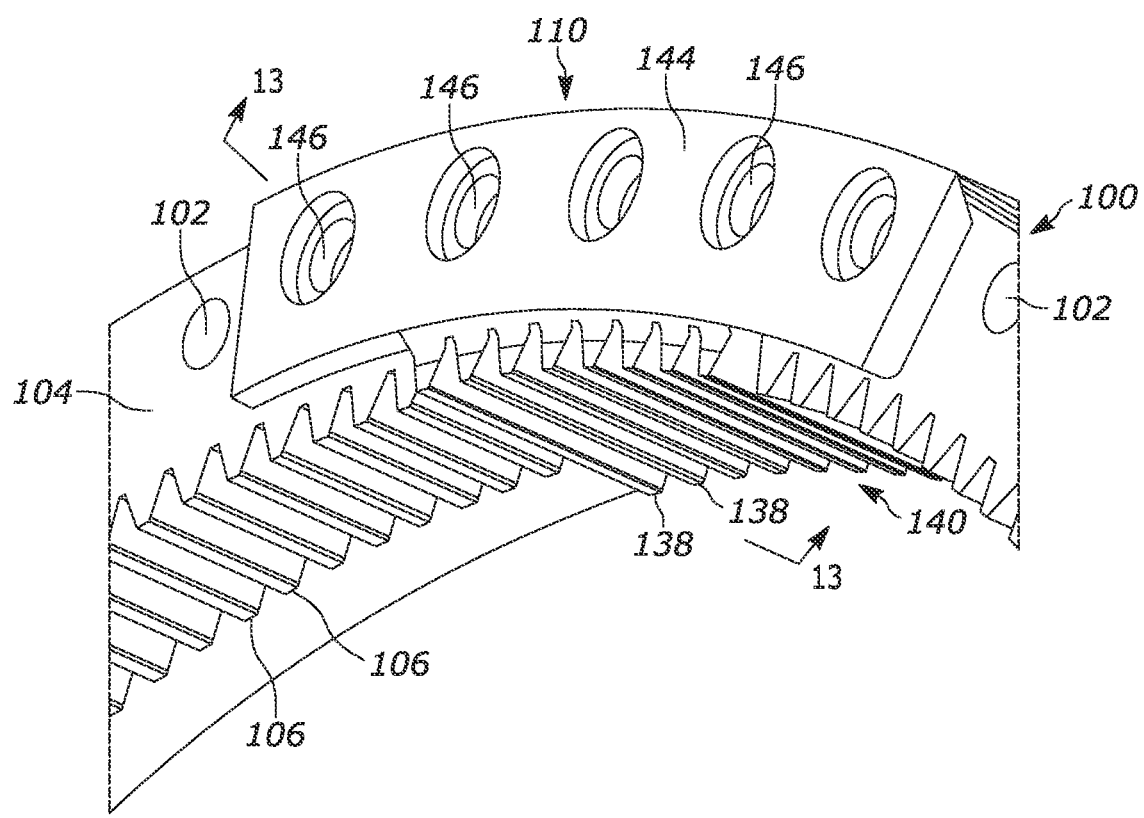
Figure 13:
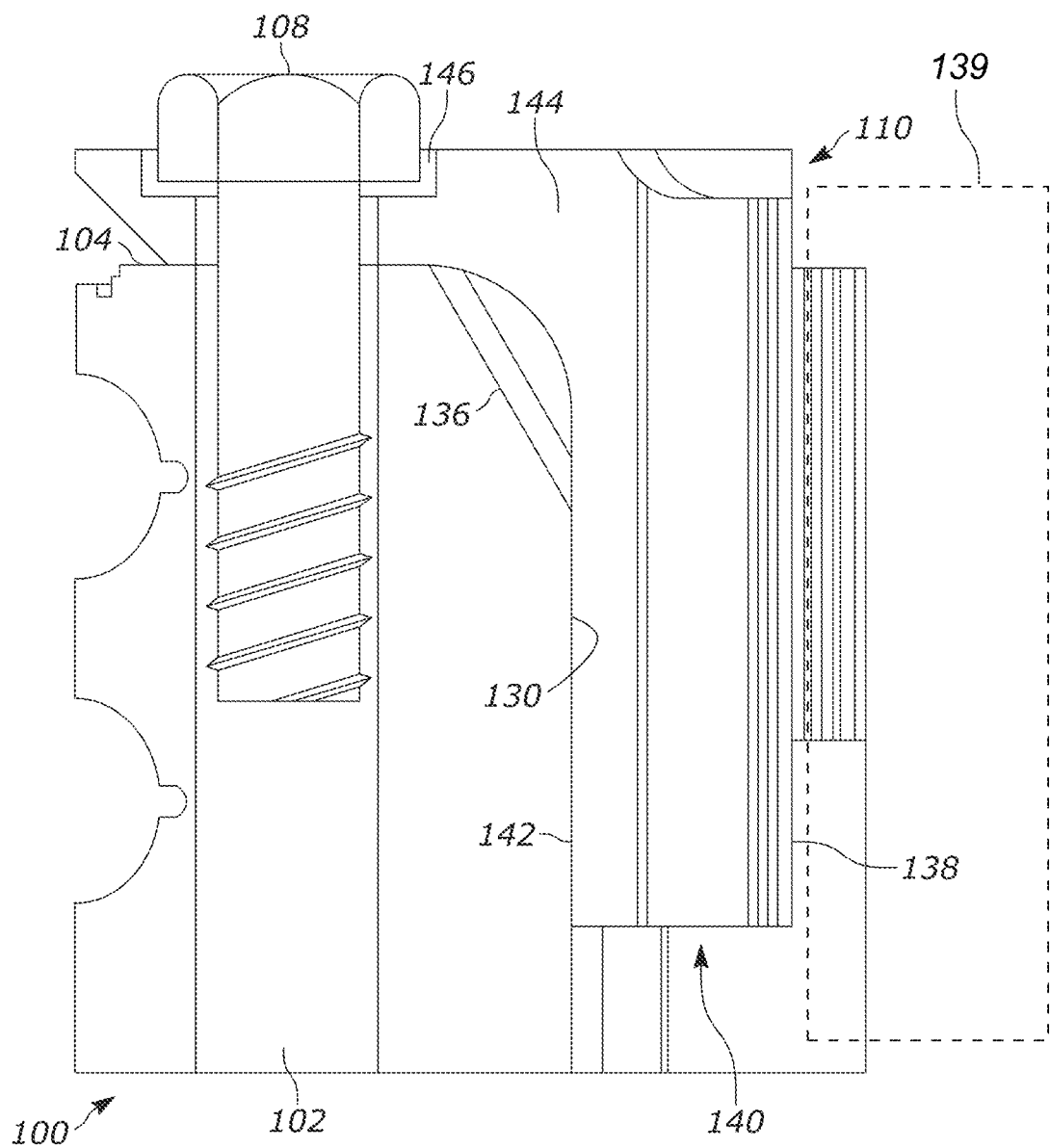
FIG. 13 is a cross-sectional view taken along line 13-13 of FIG. 12.

Turning now to FIGS. 11-12, a denture apparatus 110, which is shown and described herein as being substantially similar to that disclosed in the '955 application, may be provided to complete the gear 100 repair. The denture apparatus 110 includes at least one replacement gear tooth 138 maintained on a tooth block 140. A rear surface 142 of the tooth block 140 is mated with at least a portion of the circumferential gear cut 130. The tooth block 140 is then fastened to the gear 100, in any suitable manner. For example, and as shown in the Figures, an anchoring lip 144 of the denture apparatus 110 may include a plurality of anchoring holes 146, at least one of which corresponds to a position along the top gear surface 104 of a corresponding fastening aperture 102. As a result, the fasteners 108 removed from the gear 100 before removal of the damaged gear teeth 106D can be re-installed in their original fastening apertures 102, while being operative to maintain the denture apparatus 110 in place, as shown in FIGS. 12-13. It is contemplated, though, that different fasteners 108 may be provided, to account for the thickness of the anchoring lip 144 above the top gear surface 104, to supplant worn or damaged original fasteners 108, or for any other reason.

Regardless of how such fastening is accomplished, the tooth block 140 may be fastened to the gear 100, and maintained on the gear 100, with the at least one replacement gear tooth 138 in selective operative meshing arrangement with the corresponding toothed feature of a gear-associated component (e.g., with another gear of the wind turbine pitch assembly which meshes with the inner race working circumference, in the example environment discussed herein). An example gear-associated component is shown schematically at 139 in FIG. 13. Accordingly, following the teachings herein, one of ordinary skill in the art will be readily able to provide appropriate components for removing one or more damaged gear teeth 106D and replacing those removed teeth, in a robust and mechanically sound manner using a tool jig 112 and/or denture apparatus 110 which are indexed to the original fastening apertures 102 of the gear 100, for a particular use environment.

In order to support such a repair scheme, the components shown in the Figures and described herein may be considered to comprise a system for replacing at least one tooth 106 of a gear 100. The system may include one or more tool jigs 112 and one or more material-removal tools 128 which are configured, supplied, and arranged in such a manner as to carry out the method discussed at length above. The system may include a denture apparatus 110. It is contemplated that a "kit" could be provided, allowing a technician to transport the system into the relatively close confines of a wind turbine pitch assembly, or any other desired use environment, particularly if the gear 100 is being repaired in the field.

It is also contemplated that the tool jig(s) 112, material-removal tool(s) 128, components thereof, and/or denture apparatus(es) 110 could be provided in multiples, each having some physical difference from the others, in order to support flexibility and economy of use. For example, tool jig(s) 112 having mounting blocks 114 of various lengths could be provided, in order to facilitate replacement of varying numbers of adjacent teeth 106D. Again, one of ordinary skill in the art can readily configure suitable components for carrying out the described method as shown in the Figures and disclosed or suggested herein.

Unless defined otherwise, all technical and scientific terms used herein have the same meaning as is commonly understood by one of ordinary skill in the art to which the present disclosure pertains.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "between about X and Y" can mean "between about X and about Y."

As used herein, phrases such as "from about X to Y" can mean "from about X to about Y."

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from about 1 to about 6 should be considered to have specifically disclosed subranges such as from 1 to 3, from 1 to 4, from 1 to 5, from 2 to 4, from 2 to 6, from 3 to 6 etc., as well as individual and partial numbers within that range, for example, 1, 1.1, 2, 2.8, 3, 3.2, 4, 4.7, 4.9, 5, 5.5 and 6. This applies regardless of the breadth of the range.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A method of replacing at least one tooth of a gear, the gear including a plurality of fastening apertures extending longitudinally thereinto from a top gear surface, the top gear surface being perpendicular to an extension direction of the gear teeth, the method comprising:
    providing a tool jig including a mounting block with a plurality of laterally spaced indexing jig features, the tool jig also including a tool-supporting feature in laterally movable contact with a jig rail feature;
    placing the tool jig into a predetermined relationship with the top gear surface, guided by at least a selected indexing jig feature of the plurality of indexing jig features;
    with the selected at least one indexing jig feature, resisting relative motion of the tool jig relative to the gear;
    removably attaching a material-removal tool to the tool-supporting feature with the tool-supporting feature in a tooth-removal position;
    operating the material-removal tool, while attached to the tool-supporting feature in the tooth-removal position, to remove at least a portion of a working circumference of the gear including a native gear tooth to be replaced;
    guiding motion of the material-removal tool, while removing at least the portion of the working circumference of the gear, via interaction of the tool-supporting feature with the jig rail feature in the tooth-removal position, to generate a circumferential gear cut including a smooth first cut surface formed by removal of at least the native gear tooth to be replaced;
    removing the material-removal tool from the tool-supporting feature;
    manipulating the selected at least one indexing jig feature to release the tool jig from the gear; and
    removing the tool jig from the gear.

2. The method of claim 1, including:
    after generation of the circumferential gear cut, adjusting the tool-supporting feature to an angled support position with respect to the circumferential gear cut;
    operating the material-removal tool, while attached to the tool-supporting feature in the angled support position, to remove at least a portion of the first cut surface; and
    guiding motion of the material-removal tool, while removing at least the portion of the first cut surface, via interaction of the tool-supporting feature in the angled support position with the jig rail feature, to generate a beveled gear cut including a smooth second cut surface formed by removal of at least the portion of the first cut surface.

3. The method of claim 2, including adjusting the jig rail feature to guide the tool-supporting feature in a selected one of the tooth-removal position and the angled support position.

4. The method of claim 1, wherein the first cut surface is perpendicular to the top gear surface of the gear.

5. The method of claim 1, including:
    after generation of the circumferential gear cut, substituting the material-removal tool on the tool-supporting feature with an angled material-removal tool;
    operating the angled material-removal tool, while attached to the tool-supporting feature, to remove at least a portion of the first cut surface; and
    guiding motion of the angled material-removal tool, while removing at least the portion of the first cut surface, via interaction of the tool-supporting feature with the jig rail feature, to generate a beveled gear cut including a smooth second cut surface formed by removal of at least the portion of the first cut surface.

6. The method of claim 1, wherein the step of providing a tool jig including a mounting block with a plurality of laterally spaced indexing jig features includes:
    providing a tool jig including a mounting block with a plurality of indexing jig features being spaced mutually laterally apart by a distance corresponding to a distance between correspondingly adjacent fastening apertures in the top gear surface.

7. The method of claim 1, wherein the gear includes a plurality of fasteners maintained within corresponding fastening apertures, and the method includes removing at least one fastener of the plurality of fasteners from a corresponding fastening aperture to create a selected fastening aperture, the selected fastening aperture being located at least one of transversely adjacent to and laterally adjacent to the native gear tooth being replaced.

8. The method of claim 7, wherein the step of placing the tool jig into a predetermined relationship with the top gear surface, guided by at least a selected indexing jig feature of the plurality of indexing jig features includes:
    placing the tool jig on the top gear surface with at least the selected indexing jig feature being longitudinally aligned with the selected fastening aperture.

9. The method of claim 7, wherein each indexing jig feature of the plurality of indexing jig features is a block hole extending longitudinally through the mounting block, the method including:

placing the tool jig on the top gear surface with at least a selected block hole being longitudinally aligned with a selected fastening aperture; and inserting an elongate pin at least partially into both the selected block hole and the selected fastening aperture, to resist relative motion of the tool jig relative to the gear.

10. The method of claim 7, wherein each indexing jig feature of the plurality of indexing jig features is a jig protrusion extending longitudinally from a lower jig surface of the tool jig, the method including:

placing the tool jig on the top gear surface with at least a selected jig protrusion being longitudinally aligned with a selected fastening aperture; and inserting the selected jig protrusion into the selected fastening aperture, to resist relative motion of the tool jig relative to the gear.

11. The method of claim 1, wherein the step of operating the material-removal tool, while attached to the tool-supporting feature, to remove at least a portion of a working circumference of the gear including a native gear tooth to be replaced includes:

operating the material-removal tool, while attached to the tool-supporting feature, to remove at least a portion of the gear including a portion of the working circumference of the gear including the native gear tooth to be replaced and at least one adjacent gear tooth.

12. The method of claim 1, wherein the step of operating the material-removal tool, while attached to the tool-supporting feature, to remove at least a portion of a working circumference of the gear including a native gear tooth to be replaced includes:

operating the material-removal tool, while attached to the tool-supporting feature, to remove at least a portion of the gear including a full-thickness portion of the working circumference of the gear.

13. The method of claim 1, including:

providing a denture apparatus including at least one replacement gear tooth maintained on a tooth block;

mating a rear surface of the tooth block with at least a portion of the circumferential gear cut;

fastening the tooth block to the gear with the at least one replacement gear tooth in selective operative meshing arrangement with a corresponding toothed feature of a gear-associated component; and maintaining the tooth block on the gear during operative meshing of the gear with the gear-associated component.

\* \* \* \* \*